3,276,962
BACTERIAL EXTRACT
Pierre Lallouette, 3 Blvd. Pershing, Paris, France
No Drawing. Filed Mar. 27, 1963, Ser. No. 268,449
Claims priority, application France, Apr. 4, 1962,
893,356
8 Claims. (Cl. 167—78)

The present invention relates to an extract of bacterial origin and it is more particularly concerned with a bacterial extract, in the form of an enxymic lysate (the term lysate designating the product resulting from the destruction of bacteria by a lysin) of destroyed bacterial bodies, in the form of a desiccated powder obtained by lyophilization of such a lystate or in the form of a purified polysaccharidic fraction, as will be hereinafter described. Such a bacterial extract is prepared from a strain of a given micro-organism of the Bacillus kind having the general biochemical properties of the "subtilis mesentericus" group. This extract has the property of considerably increasing non specific immunity with respect to various infections and even of acting against declared affections.

The strain of micro-organisms in question was initially isolated from a contaminated culture of a strain of mycobacteria on a glycerized potato. A living culture was deposited at the "Culture Collection of Headquarters," Quartermaster Research & Engineering Command, U.S. Army, at Natick, Massachusetts, United States of America, where it was registered under No. QM–1585.

The therapeutic agent in question is a polysaccharidic fraction, advantageously isolatable, preferably by enzymic lysis, of killed bacterial bodies themselves obtained from isolated bacilli of culture of the strain by submerged aerobic fermentation.

This active fraction may be precipitated (for instance from a lysate) by 60% acetone or by 0.01 M copper sulfate, or by "Cetavlon" (cetyl-trimethyl-ammonium bromide) at 1/5,000. Furthermore, it does not fix itself upon the usual ion exchange resins, which permits of effecting purifications leading finally to the obtainment of a "crystallized" active fraction. As a matter of fact, the copper used for precipitating the polysaccharidic fraction may be retained on a cation exchange resin.

The micro-organism is easily cultivated in various usual mediums, both liquid (meat broth, peptonized water) and solid (gelose, Lowenstein, potato, carrot). In a broth, the culture takes the appearance of a thick veil, dissociating into flakes, whereas in peptonized water it forms a homogeneous cloud. On gelose, I obtain R colonies (that is to say of a rough appearance type well known to people skilled in the art) dry and forming layers. On Lowenstein, the growth of R colonies, of yellowish color, is quick and abundant.

Separated from its cultures, the germ appears in the microscope in the form of a bacillus easily colorable by the usual coloring materials; in particular it is Gram-positive. The bacillus in question is a fine and thin rod with rounded ends, the body of which is often granulized and the spore of which is cylindrical, from central to subterminal, non-deforming. It may develop as well as aerobia and as anaerobia. It produces, more or less quickly, fermentation of most of the sugars such as arabinose, glucose, galactose (slowly), xylose (slightly and slowly) saccharose, maltose (rather quickly), lactose (slightly and very slowly), starch (slowly), aesculin. Concerning alcohols the germ produces fermentation of mannitol but it does not cause dulcitol to ferment. It liquefies gelatin in eight days, attacks caseine, coagulates milk in eight days, liquefies in one month coagulated serum.

Micro-organisms in question further have the following characteristics:

Citrate _____(very slow)__ +
Indol _____ −
Urea _____ −
Acetyl-methyl-carbinol _____ +
Nitrites _____ +
Methyl red _____ −

All these characteristics permit of classifying this germ in the family of Bacillaceae, in the Bacillus type and in the *subtilis mesentericus* group (group 1 of the classification of Dumas of the Pasteur Institute).

Finally, it must be pointed out that the hemolytic activity of the culture broth, even pure, is always zero with respect to human and animal hematies.

It has been found that this strain has no pathogenic power by proceeding to separate inoculations and to reinoculations on experimentation animals (mice, rats, guinea pigs) which were subsequently kept in observation for several months. Thus for instance, seventy white mice of an average weight of 20 grams ($\pm 1$ g.) were inoculated (by intraperitoneal way) with amounts ranging from 0.5 to 1 ml. of a culture broth dating from 24 to 28 hours. None of the inoculated mice was dead after one month. Ten rats received each 1 ml. of an emulsion in physiological water from a culture on gelose but none of the animals showed physiological troubles. Five guinea pigs received each 2 ml. and five others 5 ml. of culture broth without any death being noted during an observation of several weeks. Concerning the reinoculations, ten rats received, during eight months, every week two inoculations of 1 ml. of an emulsion in physiologic water from a strain on gelose of 24 hours. All the animals were living after 66 injections. Thirty guinea pigs received from 0.5 to 1 ml. of an emulsion of germs, by intraperitoneal way, once or twice per week during 20 months.

The greater number of examinations was made on said thirty guinea pigs, by comparison with fourteen animals which had not been treated. Leucocytic numerations and formulas made it possible to detect a small variation of the mean value of the leucocytic numeration (14,300/mm.$^3$ for the treated animals against 11,500/mm.$^3$ for the witness animals) and a small lymphacitic reaction of the treated animals. Upon 120 reticulo-endotheliales Sandor cards, obtained by the Vargues method for the thirty guinea pigs that were treated, 72 examinations (58%) indicated significant modifications of the precipitation in a buffer solution having a pH of 5.8. This increase generally appears at about the fifth injection and is a proof of a reaction of the reticulo-endothelial system. No modification of this kind was found to exist after a single inoculation.

This stimulation of the reticulo-endothelial system in some conditions would lead to think that the strain, the definitely non pathogeneous character of which results from these observations, might be capable of increasing the non specific immunity against an experimental infection.

As a matter of fact, studies pursued on several hundreds of animals, in particular on mice infected with a highly virulent strain of *Escherichia coli* 111 B4, made it possible to observe excellent protections, ranging from 80 to 100%.

These systematic studies made it possible to find that the activity determining the non-specific immunity is concentrated solely on the microbian bodies which can be collected either in the form of a pellet remaining after a high centrifugation of a liquid culture medium or on the filter after filtering of such a medium. Neither the liquid located above the centrifugation pellet nor the filtrate have any substantial activity. In both cases, the whole of the activity observed in the culture broth is found in the microbian bodies. On the other hand, the active fraction maintained in the microbian bodies is altered neither after a cold treatment by acetone and ether intended to kill the micro-organism nor after a treatment of thirty minutes at 120° C. in a autoclave receiver, both of these treatments being possibly combined without inconvenience.

Having indicated the essential characteristics of the new substances according to the invention, the methods of preparing these substances will now be described.

The operations to be performed are in particular as follows:

(a) *Fermentation operation.*—It is advantageously conducted in sugared peptonized mediums which have been previously sterilized by heating for thirty minutes in an autoclave container at 120° C. An economical medium capable of giving a good yield in bacteria is the following one: peptone 1%, saccharose 1%, the origin of the peptone being apparently without importance. The micro-organism in question develops therein very quickly, in submerged culture, at a temperature of 37° C., with sterile air being blown at the rate of about one volume of air for one volume of fermentation medium and per minute, during the whole of fermentation without any other mechanical stirring. The initial sowing of the medium may be conducted in a conventional manner either from an emulsion, in sterile physiological water prepared from a 24 hours gelose, or from a preliminary culture. The resulting product is collected after a time ranging from 48 to 60 hours. By increasing aeration to more than 0.5 volume of air per volume of medium and per minute, it is possible to obtain an optimum collection at about the 36th hour.

(b) *Separation of the microbian bodies.*—When it is thought that the maximum point of growth of the culture has been reached, the germs are isolated from the culture medium through any suitable means, either continuous or discontinuous, such as centrifugation, filtration, precipitation by acetone. If the centrifugation method is used, the remaining pellet is placed back in suspension in physiological serum so as to wash therein the microbian bodies, which are finally separated by a further centrifugation. If the collection of bacteria is particularly abundant, centrifugation permits of obtaining only an imperfect separation and it is possible to proceed to an acetonic precipitation by adding, for instance, 0.8 volume of acetone per volume of the culture medium. The receivers are kept at low temperature (−20° C.) during precipitation. The precipitate is collected and centrifugated.

(c) *Destruction of the microbian bodies.*—In order to kill the microbian bodies, the final centrifugation pellet is placed in suspension in twenty times its volume of acetone, at a temperature of −20° C. In these conditions, acetone constitutes a lethal and dehydrating medium with respect to the germs. In order to obtain a homogeneous suspension, which is quite necessary, the product is stirred very strongly but for a short time then a separation by decantation is caused to take place in the cold state for ten minutes before a further centrifugation. This treatment is repeated in the same conditions in a new fraction of acetone and the centrifugation pellet or residue is placed in suspension in ethyl ether. This ether, which is made to act at a temperature of −20° C., constitutes a delipiding medium for the microbian bodies precedingly killed and dehydrated by acetone. The whole is centrifugated a last time. Drying is effected in a vacuum in the presence of phosphoric anhydride of the mass of killed microbian bodies thus obtained, which is finally in the form of a non hygroscopic brownish powder adapted to be preserved in closed vessels for at least eighteen months at ordinary temperature (about 20° C.). This powder is easily placed in homogeneous suspension in water. The activity thereof is checked up experimentally.

(d) *Preparation of the lysate.*—The use, for therapeutic experimental purposes, of the killed microbian bodies in the solid state being not very convenient, it has been endeavored to release the active fraction by lysis of these killed microbian bodies. It has been found that the most advantageous lysis method consists in first attacking, by the lysozyme, the killed microbian bodies, then in a second step in effecting a practically total destruction of the killed microbian bodies by action of proteolytic enzymes, either of the animal or of the fungic types. This lysis in two steps releases, without modifying it, the active fraction which determines the non specific immunity. A lysis by heat would also permit of releasing the activity but much less completely than by means of an enzymatic lysis.

By way of example, the preparation of the lysate may take place in the following manner:

For the first lysis step, use is made of egg white lysozyme in the form of chlorhydrate, lyophilized and sterile (for instance that prepared and sold in France by the Ronchese Laboratories). A solution in physiological serum of lysozyme is prepared when it is to be used at the rate of 100 gammas per milliliter of suspension of killed microbian bodies to be treated. This last mentioned suspension, itself prepared in physiological serum (containing 9 grams of sodium chloride per liter), contains 1.5 milligrams of powder of killed microbian bodies per milliliter of lysate to be prepared. The mixture is placed in a heating oven at 37° C. and kept therein for thirty minutes.

This first lysis step may lead to the desired result even if lower proportions of lysozyme are used, but it is then necessary to increase the duration of incubation. Experiments will make it possible to check up whether the enzymatic lysis is correctly performed with $50\gamma$/ml. in 60 minutes or with $20\gamma$/ml. in 90 minutes for instance.

The second lysis step consists in directly adding, to the suspension treated with the lysozyme, 50 gammas of an enzyme in the form of a solid powder per milliliter of this suspension. This enzyme is either trypsin or a protease of fungic origin, consisting of extracts of *Aspergillus flavus*. Trypsin may be relatively active at a concentration of $25\gamma$/ml. The resulting product is heated in an oven at 37° C. for one hour.

It is easy to follow the evolution of lysis by measuring, by means of a photometer graduated in units of optical density, the degree of transparency of the solution, which quickly tends toward a constant value of the "optical density". As a matter of fact the lysate is practically "optically empty."

When the lysis is terminated, the lysate is filtered and then it is distributed in bulbs of from 2 to 5 ml. which are placed for about 20 minutes in an autoclave receiver at 120° C. so as to destroy the enzymes, but without affecting the immunizing activity. The final lysate chiefly contains, besides the polysaccharides which constitute the active fraction thereof, the products of degradation of the microbian proteins by protease desoxyribonucleic acids (or ADN).

If it is desired to obtain more concentrated lysates, suitable results may be obtained provided that the mixture is stirred during lysis. For every ml. of suspension containing 10 mg. of powder of killed microbian bodies, $170\gamma$ of lysozyme and $340\gamma$ of protease should be used.

Finally, lyophilization of the lysates (and chiefly of course of the concentrated lysates corresponding to 10 mg. of powder of killed microbian bodies per ml.) involves no technical difficulties. It permits of obtaining non hygroscopic powder of a global activity identical to that of the corresponding lysate.

(e) *Checking tests.*—This preparation is tested to check up the killed microbian bodies and the lysate.

First, tests are made for determining the acute toxicity (lethal doses) according to the conventional methods of statiscal experimentation. It is thus found that the $DL_{50}$ of killed bacterian bodies, by intra-peritoneal way and for white mice of an average weight of 20 gr. (±1 gr.), corresponds to a weight of dry bacilli averaging 10 mg. (use is possibly made of a non lysed emulsion of killed bacterian bodies so as not to be compelled to inject a volume higher than 1 ml.). The limit $DL_{100}$ averages 15 mg. and the limit $DL_0$ averages 5 mg. of Bacilli. These results confirm the remarkable absence of toxicity of the strain, effected on culture broths. As a matter of fact it is necessary to go as high as 50 mg./kg. to reach the $DL_{50}$ by intraperitoneal way.

In order to measure the activity of the lysate, the non specific activity with respect to an experimental infection is checked up. For this purpose use is made of a virulent strain of *Escherichia coli* 111 B4 isolated from an infantile gastroenteritis and supplied by the Pasteur Institute.

Experiments are made on homogeneous sets of white mice each of which weighs 20 gr. (±1 gr.) in perfect state and free, in particular, of any cutaneous lesion. The pathogenic power of the preparation of *Escherichia coli* is measured by inoculating to every animal, through the intraperitoneal way, 0.5 ml. of an inoculum consisting either of the virulent culture broth as such, or of ½, ¼, ⅛ dilutions prepared from this virulent broth with non seaded nutrient broth. It is thus possible to determine to what corresponds the limit $DL_{100}$. In order to measure the immunizing activity of the lysate, sets of mice receive 0.5 ml. of physiological serum by intra-peritoneal way. Other sets of mice receive 0.5 ml. of bacterial lysate also by intraperitoneal way. 24 hours later, all the animals receive the injection of suitable dilution of the virulent strain of *Escherichia coli*. The results are noted after 48 hours. However, the surviving animals are examined after 8 days. The percentage of protection for the treated animals must be 100% for the limit $DL_{100}$.

It is possible to express in "mouse units" the activity of a given preparation. The mouse unit corresponds to the amount of active product capable of ensuring a 100% protection to animals treated with the limit $DL_{100}$ of a strain of *Escherichia coli* 111 B4 injected through the intraperitoneal way.

Study of the activity contained both in the powder of the killed microbian bodies and in the lysate prepared from this powder therefore discloses properties of a high interest. First a remarkable stability to the action of heat since no substantial loss of activity is detected after 30 minutes of treatment in an autoclave receiver at 120° C. Secondly, this activity is not destroyed by delipidation in the cold state by acetone and ether. The activity contained in the microbian bodies is released by heat lysis, but more completely by enzymatic lysis. The active fraction resists to the action of the lysozyme and to that of the various proteolytic enzymes both of the proteinase type and of the proteopolypeptidase type. It is possible to concentrate the activity by precipitation by means of acetone in the proportion of two volumes and/or by precipitation by copper sulfate. Finally checking tests practised with the use of desoxyribonucleic acids isolated from the microbian bodies according to the Palmade and Vendrely method made it possible to confirm the absence of activity of these fractions. The activity must therefore correspond to the polysaccharides.

As a matter of fact, as already stated hereinbefore, it is possible to isolate a crystallized "active fraction," in particular from a lysate, by precipitating the polysaccharides in the form of a copper complex by mere addition of a sufficient amount of copper sulfate 0.01 M. Once this complex has been isolated by filtration, it is placed back in suspension in water. This suspension is stirred in the presence of a strong cation exchange resin (for instance an IR 120-H resin) on which the copper ions of the complex are fixed. By proceeding to a series of freezings and unfreezings of the copper liquor from which copper has been removed, a purified active polysaccharidic fraction is separated therefrom, which fraction is in the form of cold active crystals 50γ of which represent at least one mouse unit. These 50γ of crystals are the final result of the treatment of 750γ of powder of killed microbian bodies.

The therapeutic agent in question is not efficient only to ensure a non specific immunity with respect to microbian infections. As a matter of fact it has been possible to show, for instance, that it permits of giving a significant immunity with respect to Ehrlich ascites, by its action on mice on which this tumor has been grafted. If these test animals are injected, by intra-peritoneal way, with a dilution of ascites representing an amount of cells corresponding to the threshold for catching the tumor at 100%, all the animals of these groups died with voluminous tumors, after 18 days (average duration 16.3 days). At this time, all the animals of another group called "treated group" (which were, on the same day as the witness animals, inoculated with the same dilution of ascites in the same conditions and in the same quantity but which subsequently received every second day a dose of 0.5 ml. of lyophilized lysate corresponding to 2.5 mg. of raw extract of bacterial bodies) show little or no ascites. This experimentation permits, to a certain degree, of explaining the results obtained on man in several cases of serious cancers.

The therapeutic agent in question may therefore be either in the form of a lysate of suitable concentration, prepared as above described or in the form of a dried powder obtained by lyophilization of such a lysate. It may also exist in the form of a purified polysaccharidic fraction resulting from the above specified treatment of the copper complex. This last mentioned presentation of the therapeutic agent in question is particularly advantageous because no intolerance reaction is observed after administration through the parenteral way of suspension of this extract in physiological serum for instance.

The lysate may be prepared in bulbs of 2 ml. or 5 ml. corresponding respectively to a low dose and a high dose, of 3 mg. and 7.5 mg. of dry killed bacterial bodies. The lysate may be administered by an intra-muscular injection. In some cases, where the patient is very weak, and during the hours that follow the injection, reactions of the vaccinal type are produced, but which are never important enough to make it necessary to stop regular administration of the product used in this form. The lysate administered by the mouth is remarkably well supported even for high doses, without unfavorable general reactions.

The frequency at which the doses are administered and the duration of the treatment are determined by the doctor according to the nature of the disease, to the state of the patient and to the evolution of the symptoms the regression of which is often spectacular. For instance, it is possible to stop the evolution and even to obtain resorption of cancerous tumors and metastases on different portions of the body (breast, lung, vertebras, amygdalae, mesenterium, etc.). The remedy may also improve the state of patients suffering of multiple sclerosis with paresthesia disorders (lowering of visual acuity, disorders of the balance, disorders of deep sensitivity, etc.) of obstinate aphthous diseases, of zonas, and so on.

What I claim is:

1. A process for the production of a therapeutic composition characterized by the absence of pathogenic power on experimental animals, non-specific immunizing action and an activity, expressed in mouse-units, ensuring a hundred percent survival of mice inoculated subsequently with otherwise lethal doses of a strain of *Escherichia coli* 111 B4 injected intraperitoneally, which comprises fermenting under submerged aerobic conditions a strain of bacteria of the Bacillus kind and of the *subtilis mesentericus* group, a living culture of which is registered at the culture collection of Headquarters, Quartermaster Research and Engineering Command, U.S. Army, in Natick, Massachusetts, under No. QM-B 1585, separating the microbian bodies from the fermentation broth and suspending the microbian bodies in acetone whereby they are killed and dehydrated, separating the treated bodies from the suspension medium, delipiding said bodies in ether, subjecting said delipided bodies to a treatment comprising first, the action of lysozyme and second the action of an enzyme selected from the group consisting of trypsin and of the protease contained in the *Aspergillus flavus* strain, obtaining thereby the therapeutic composition under the form of a lysate.

2. A process for the production of a therapeutic composition characterized by the absence of pathogenic power on experimental animals, a non-specific immunizing action and an activity, expressed in mouse-units, ensuring a hundred percent survival of mice inoculated subsequently with otherwise lethal doses of a strain of *Escherichia coli* 111 B4 injected intraperitoneally, which comprises fermenting under submerged aerobic conditions a strain of bacteria of the Bacillus kind and of the *subtilis mesentericus* group, a living culture of which is registered at the culture collection of Headquarters, Quartermaster Research and Engineering Command, U.S. Army, in Natick, Massachusetts, under No. QM–B 1585, separating the microbian bodies from the fermentation broth and suspending the microbian bodies in acetone whereby they are killed and dehydrated, separating the treated bodies from the suspension medium, delipiding said bodies in ether, subjecting said delipided bodies to a treatment comprising first, the action of lysozyme and second the action of an enzyme selected from the group consisting of trypsin and of the protease contained in the *Aspergillus flavus* strain, to obtain a lysate, treating said lysate with copper sulfate in an acetone solution to form an insoluble copper complex and removing said copper from said complex, whereby said composition is obtained under the form of a crystallized fraction, having an activity of about 20 mouse-units per milligram.

3. A therapeutic composition characterized by the absence of pathogenicity on experimental animals, a non-specific immunizing action and the ability to ensure a hundred percent survival of mice inoculated subsequently with otherwise lethal doses of a strain *Escherichia coli* 111 B4 injected intraperitoneally, said composition having an activity of about 1.3 mouse-unit per milligram, said composition consisting of the product obtained by fermenting under submerged aerobic conditions a strain of bacteria of the Bacillus kind and of the *subtilis mesentericus* group, a living culture of which is registered at the culture collection of Headquarters, Quartermaster Research and Engineering Command, U.S. Army, in Natick, Massachusetts, under No. QM–B 1585 and when the maximum point of growth has been reached, separating the microbian bodies from the culture medium and treating said microbian bodies first with acetone for killing said microbian bodies and second by ethyl-ether for delipiding said killed microbian bodies said killed and delipided bodies constituting then said therapeutic composition.

4. A therapeutic composition characterized by the absence of pathogenicity on experimental animals, a non-specific immunizing action and the ability to ensure a hundred percent survival of mice inoculated subsequently with otherwise lethal doses of a strain *Escherichia coli* 111 B4 injected peritoneally, said composition consisting in the product obtained by fermenting under submerged aerobic conditions a strain of bacteria of the Bacillus kind and of the *subtilis mesentericus* group, a living culture of which is registered at the culture collection of Headquarters, Quartermaster Research and Engineering Command, U.S. Army, in Natick, Massachusetts, under No. QM–B 1585 and, when the maximum point of growth has been reached, separating the microbian bodies from the culture medium, treating said microbian bodies first with acetone to kill said microbian bodies and second with ethyl-ether to delipid said killed microbian bodies, subjecting said microbian bodies to a treatment consisting of first the action of lysozyme and second the action of an enzyme selected from the group consisting of trypsine and of the protease contained in the *Aspergillus flavus* strain whereby said therapeutic composition is obtained in the form of a lysate.

5. A therapeutic composition characterized by absence of pathogenicity on experimental animals, a non-specific immunizing action and the ability to ensure a hundred percent survival of mice inoculated subsequently with otherwise lethal doses of a strain *Escherichia coli* 111 B4 injected peritoneally, said composition having an activity of about 20 mouse-units per milligram and consisting of the product obtained by fermenting under submerged aerobic conditions a strain of the Bacillus kind and of the *subtilis mesentericus* group, a living culture of which is registered at the culture collection of Headquarters, Quartermaster Research and Engineering Command, U.S. Army, in Natick, Massachusetts, under No. QM–B 1585 and, when the maximum point of growth has been reached, separating the microbian bodies from the culture medium, treating said microbian bodies first with acetone to kill said microbian bodies and secondly with ethyl-ether, to delipid said killed microbian bodies, subjecting said microbian bodies to a treatment consisting of first, the action of a lysozyme and second, of an enzyme selected from the group consisting of trypsine and of the protease contained in the *Aspergillus flavus* strain, treating the lysate obtained with copper sulfate in an acetone solution to form an insoluble copper complex, removing copper from said complex whereby said composition is obtained in the form of a crystallized fraction.

6. A method of treating infectious diseases which comprises injecting into a patient a solution, in an inert medium, of the microbian bodies separated from the culture broth obtained by the fermentation under submerged aerobic conditions, of a strain of bacteria of the Bacillus kind and of the *subtilis mesentericus* group, a living culture of which is registered at the culture collection of Headquarters, Quartermaster Research and Engineering Command, U.S. Army, in Natick, Massachusetts, under No. QM–B 1585.

7. A method of treating bacterial and infectious diseases which comprises injecting into a patient a solution, in an inert medium, of the composition obtained by fermenting under submerged aerobic conditions a strain of the Bacillus kind and of the *subtilis mesentericus* group, a living culture of which is registered at the culture collection of Headquarters, Quartermaster Research and Engineering Command, U.S. Army, in Natick, Massachusetts, under No. QM–B 1585, separating the microbian bodies from the fermentation broth, treating said microbian bodies first with acetone to kill said microbian bodies and, second, with ether to delipid said killed microbian bodies, subjecting said microbian bodies to a lysis treatment first with lysozyme and secondly with an enzyme selected from the group consisting of trypsine and of the protease contained in the *Aspergillus flavus* strain to yield the above composition under the form of a lysate.

8. A method of treating infectious diseases which comprises the injecting into a patient a solution, in an inert medium, of the composition obtained by fermenting under submerged aerobic conditions a strain of the Bacillus kind and of the *subtilis mesentericus* group, a living culture of which is registered at the culture collection of Headquarters, Quartermaster Research and Engineering Command, U.S. Army, in Natick, Massachusetts, under No. QM–B 1585, separating the microbian bodies from the fermentation broth, treating said microbian bodies first with acetone to kill said microbian bodies and second with ether to delipid said killed microbian bodies, subjecting said microbian bodies to a lysis treatment first with lysozyme and secondly with an enzyme selected from the group consisting of trypsine and of the protease contained in the *Aspergillus flavus* strain, treating the lysate obtained with an acetone solution of copper sulfate to form an insoluble copper complex therewith, and removing the copper from said complex to yield the above composition under the form of a crystallized fraction.

References Cited by the Examiner

UNITED STATES PATENTS

| | | | |
|---|---|---|---|
| 1,584,583 | 5/1926 | Wood | 167—78 |
| 2,176,004 | 10/1939 | Reichel | 167—78.5 X |
| 3,089,821 | 5/1963 | Folkers | 167—78 |
| 3,097,141 | 7/1963 | Kidwell | 167—78 |

OTHER REFERENCES

Becker et al.: Archives of Biochemistry and Biophysics, vol. 53, pp. 402–410, 1954.

Nomura et al.: J. Bacteriology, vol. 72, pp. 573–581, 1956.

LEWIS GOTTS, *Primary Examiner.*

JULIAN S. LEVITT, *Examiner.*

RICHARD L. HUFF, *Assistant Examiner.*